No. 646,376. Patented Mar. 27, 1900.
M. R. & M. T. SCHAFFER.
BACK PEDALING BRAKE.
(Application filed Dec. 10, 1898.)
(No Model.)
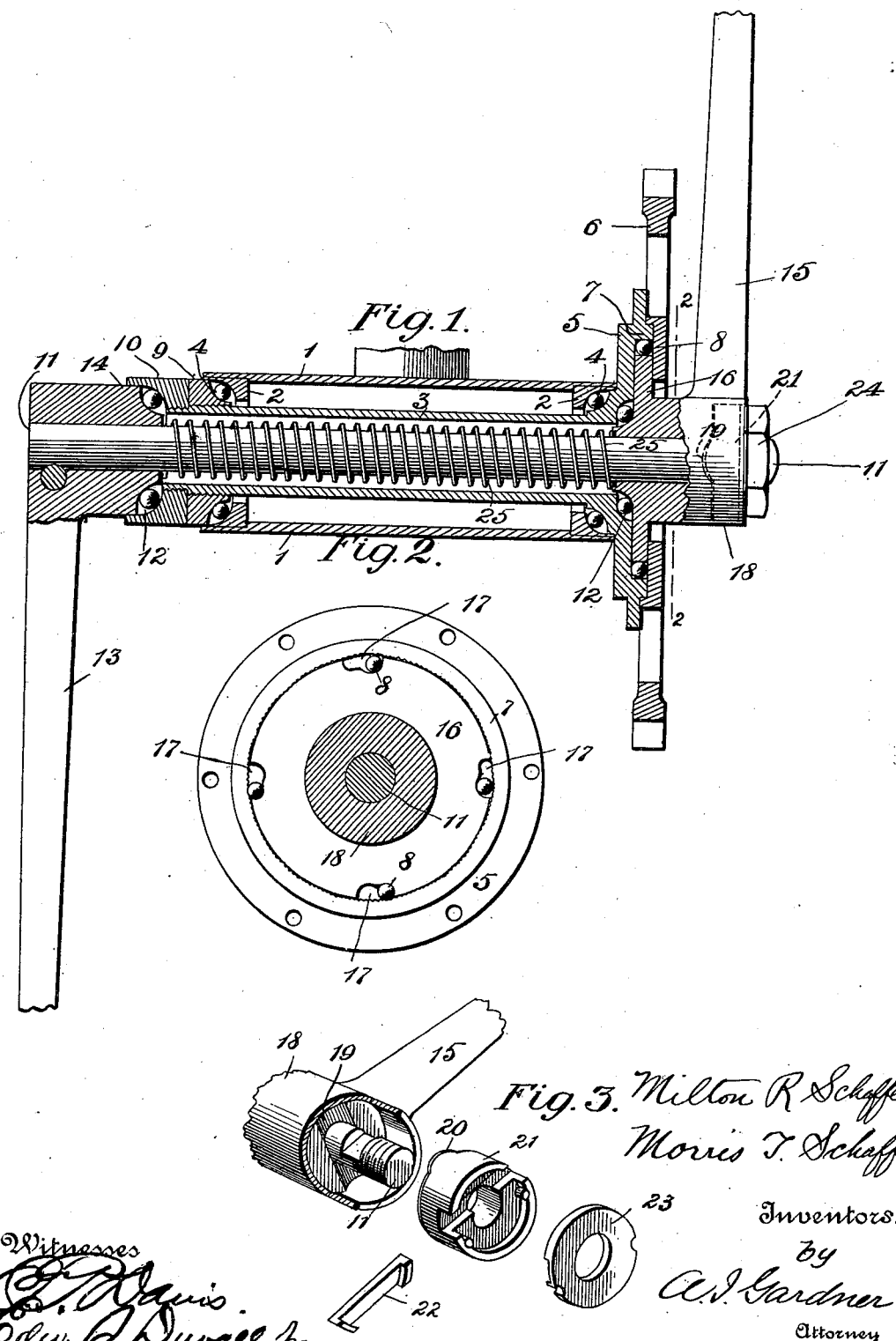

United States Patent Office.

MILTON R. SCHAFFER, OF SOUTH WHITEHALL, AND MORRIS T. SCHAFFER, OF BETHLEHEM, PENNSYLVANIA.

BACK-PEDALING BRAKE.

SPECIFICATION forming part of Letters Patent No. 646,376, dated March 27, 1900.

Application filed December 10, 1898. Serial No. 698,922. (No model.)

*To all whom it may concern:*

Be it known that we, MILTON R. SCHAFFER, residing at South Whitehall, Lehigh county, and MORRIS T. SCHAFFER, residing at Bethlehem, in the county of Northampton, State of Pennsylvania, citizens of the United States, have invented certain new and useful Improvements in Back-Pedaling Brakes for Bicycles, of which the following is a specification.

Our invention relates to improvements in back-pedaling brakes for bicycles.

Our brake is intended to be used in combination with driving mechanism in which a clutch is interposed between the driving-axle and the wheel to be driven, said clutch being adapted to engage when force is applied to the driving-axle for forward motion and to disengage and permit said wheel to revolve independent of said axle when said force is discontinued. A variety of such clutches are in common use, and the clutch used by us forms in itself no part of our invention.

The object of our invention is to provide a brake that is simple in construction, durable, and effective in operation. We attain this object by means of the mechanism illustrated in the accompanying drawings, in which—

Figure 1 is a longitudinal sectional view. Fig. 2 is a section on the line 2 2 of Fig. 1 with sprocket-wheel removed, and Fig. 3 is a view of cam and coöperative parts dissembled.

Similar figures refer to similar parts throughout all of the views of the drawings.

In the drawings, 1 represents the crank-hanger, which is provided with the usual cups 2 2 at each end.

3 is our tubular sprocket-shaft, which is supported on the ball-bearings 4 4, commonly utilized to support the crank-shaft, and is provided at one end with a disk 5 and the usual detachable sprocket 6, said disk forming the outer member of the driving-clutch. Said disk is flanged at 7 to retain the clutch-balls 8, the inner surface of said flange being preferably serrated to prevent slipping when in contact with said balls. At the other end the sprocket-shaft is fitted with the adjustable cone 9 and lock-nut 10, the outer surface of said lock-nut being cupped to form a ball-bearing. Axle 11 is supported upon the sprocket-shaft upon ball-bearings 12 12 intermediate of said shaft and axle. Crank 13 is rigidly secured to axle 11, and the inner end of its hub forms the cone 14 to correspond with cup 10. Crank 15 is loosely mounted upon axle 11, and the inner face of its hub is enlarged radially to form the inner member 16 of the driving-clutch. The clutch-ball recesses 17 in the outer edge of said inner clutch member 16 are deeper at one end than at the other, so that when said inner member is rotated forward relative to its outer member the balls will roll toward the shallow ends of the recesses and bind against the serrated surface of said outer member and lock the two members together. When the inner clutch member is rotated backward relative to the outer member, the balls will roll into the deeper ends of the recesses and will permit the independent movement of the parts, the inner end of the crank-hub being formed into a cone to act in connection with the corresponding cup on the sprocket-shaft.

The outer end of the hub 18 is counterbored and recessed transversely at 19 to receive the cam 20 of the cam-washer 21, said washer being secured in position on the axle 11 by the cotter-pin 22. Said cam-washer and said cotter-pin are recessed to receive the locking-disk 23. This locking-disk finishes the contour of said cam-washer on its outer side and is held in place by the lock-nut 24, screwed on the axle. In the drawings pins are shown to hold said locking-disk in position in the cam-washer; but while this construction is considered preferable it is not absolutely necessary, as an ordinary washer slipped into the circular recess in the cam-washer and cotter-pin must impinge against the flanges on these parts and so hold the cotter-pin in position.

The compressed spiral spring 25, surrounding the axle 11 from hub to hub, tends to keep hub-recess 19 in close engagement with cam 20 and the ball-bearings 12 12 relatively loose. When sufficient downward force is applied to each of the cranks simultaneously, the crank 15 is rotated relative to the cam-washer 21, and through the action of cam 20 in relation to recess 19 the axle 11 is drawn a short distance outwardly through the hub 18, tightening or jamming the ball-bearings 12 12 in proportion to the amount of force applied, thus forming a brake to oppose the rotation of tubular sprocket-shaft 3.

In order that the ordinary downward pressures upon the cranks incidental to coasting may not apply the brake, the spiral spring 25, of sufficient strength to counteract such pressures, is inserted, as above indicated.

The operation of our device is as follows: When the machine is being driven, the cranks act through the clutch to drive the sprocket-shaft and sprocket, all turning together practically as a single piece of mechanism on the ball-bearings 4 4. When it is desired to coast, the cranks are held stationary, the clutch is released, and the sprocket rotates between both sets of ball-bearings 4 4 and 12 12, this arrangement resulting in a minimum of friction for the sprocket-wheel while coasting. When it is desired to apply the brake, both cranks are pressed downward simultaneously, when through the action of the cam the axle is drawn toward and somewhat through the loose hub, jamming the balls 12 12 in their races and so acting as a brake to stop the revolving sprocket-shaft.

What we claim, and desire to secure by Letters Patent of the United States, is—

1. The combination in a bicycle of a crank-hanger, a tubular sprocket-shaft supported in ball-bearings in said hanger, a crank-axle supported in ball-bearings in said tubular sprocket-shaft, a fixed crank and a loose crank on said axle, a clutch between said axle and said shaft and means on the axle to force the cranks toward each other and against the interior set of ball-bearings whereby said interior set serve not only to support said axle but also as braking-surfaces.

2. The combination in a bicycle of a driving-axle, one crank rigidly secured thereto, one crank rotatable thereon through a small arc, a tubular sprocket-shaft concentric with said axle, a clutch connecting said axle and said shaft and a brake between said axle and said shaft and means for causing said brake to operate upon a simultaneous depression of said cranks, said means consisting of a cam fixed upon said axle and a corresponding recess in the hub of said rotatably-mounted crank.

3. The combination in a bicycle, of a driving element, a driven element, an intermediary clutch, an intermediary brake and a cam-washer for throwing said brake into engagement consisting of a cylindrical disk having a cam on one end and a circular recess in the other end, a transverse groove cut across the bottom of said circular recess, in combination with a cotter-pin adapted to fit in said groove, said pin having flanges to correspond with the walls of the recess and a washer to fit in said recess and to lock the cotter-pin in position.

4. The combination in a bicycle, of a driving element, a driven element, an intermediary clutch, ball-bearings between said driving and driven elements and means for tightening said bearings, whereby said bearings serve not only to support said driving element but also as a brake.

5. The combination in a bicycle, of a driven element, a driving element supported on ball-bearings by the driven element, a clutch intermediate of said driven and driving element, and means on the driving element for pressing the parts of the ball-bearings together to act as a brake.

6. The combination in a bicycle, of a crank-hanger, a tubular sprocket-shaft, intermediary ball-bearings, a flanged and cupped disk secured to one end of said shaft, an adjustable cone at the other end of said shaft, a cupped lock-nut securing said cone in position, a driving-axle, a fixed crank and a loose crank upon said axle, ball-bearings between the hubs of said cranks and said sprocket-shaft, a radial enlargement of the hub of said loose crank, tapered recesses in the outer edge thereof and clutch-balls in said recesses, a transverse recess in the outer end of the hub of said loose crank, a cam-washer secured to said axle and adapted to engage with said transverse recess to force said cranks toward each other upon a simultaneous depression of said cranks, and a compressed spiral spring between said cranks, substantially as described.

In testimony whereof we affix our signatures in presence of witnesses.

MILTON R. SCHAFFER.
    MORRIS T. SCHAFFER.

Witnesses as to Milton R. Schaffer:
 J. C. RATHBONE,
 T. C. GATELY.
Witnesses as to Morris T. Schaffer:
 O. E. GROMAN,
 H. A. GROMAN.